(12) United States Patent
Syrjärinne et al.

(10) Patent No.: US 7,085,546 B2
(45) Date of Patent: Aug. 1, 2006

(54) METHOD, APPARATUS AND SYSTEM FOR GPS TIME SYNCHRONIZATION USING CELLULAR SIGNAL BURSTS

(75) Inventors: Jari Syrjärinne, Tampere (FI); Harri Valio, Lempäälä (FI); Kimmo Alanen, Tampere (FI)

(73) Assignee: Nokia Corporation, Espoo (FI)

( * ) Notice: Subject to any disclaimer, the term of this patent is extended or adjusted under 35 U.S.C. 154(b) by 287 days.

(21) Appl. No.: 10/720,041

(22) Filed: Nov. 19, 2003

(65) Prior Publication Data

US 2004/0137916 A1 Jul. 15, 2004

Related U.S. Application Data

(63) Continuation of application No. 09/777,521, filed on Feb. 5, 2001, now Pat. No. 6,678,510.

(51) Int. Cl.
*H04B 1/06* (2006.01)
(52) U.S. Cl. ............... 455/255; 455/427; 455/502; 342/357.01; 342/357.06
(58) Field of Classification Search ............... 455/255, 455/427, 456.1, 13.2, 502, 12.1, 259; 342/357.01, 342/357.06, 357.12
See application file for complete search history.

(56) References Cited

U.S. PATENT DOCUMENTS

| | | | |
|---|---|---|---|
| 4,445,118 A | 4/1984 | Taylor et al. | |
| 5,663,735 A | 9/1997 | Eshenbach | |
| 5,841,396 A | 11/1998 | Krasner | |
| 6,041,222 A | 3/2000 | Horton et al. | |
| 6,122,506 A | 9/2000 | Lau et al. | |
| 6,150,980 A | 11/2000 | Krasner | |
| 6,178,195 B1 | 1/2001 | Durboraw et al. | |
| 6,295,023 B1 | 9/2001 | Bloebaum | |
| 6,400,314 B1 | 6/2002 | Krasner | |
| 6,421,002 B1 | 7/2002 | Krasner | |
| 6,433,734 B1 | 8/2002 | Krasner | |
| 2001/0028321 A1 | 10/2001 | Krasner, IV | |

FOREIGN PATENT DOCUMENTS

WO WO 00/36431 6/2000

*Primary Examiner*—Temica Beamer
(74) *Attorney, Agent, or Firm*—Ware, Fressola, Van Der Sluys & Adolphson LLP

(57) ABSTRACT

A system, apparatus and corresponding method by which to synchronize to a time reference a main module of a device—a main module such as global positioning system (GPS) receiver—using a cellular communication signal received by a cellular module also included in the device. To synchronize the main module to the reference time, the invention provides a method including the steps of: having the cellular module respond to the cellular communication signal by providing to a clock module of the main module a trigger pulse derived from the data component of the cellular communication signal, and also by providing to the main module information relating the trigger pulse to a universal time. The main module is then able to resolve a value for time based on the information relating the trigger pulse to a universal time and the trigger pulse.

28 Claims, 2 Drawing Sheets

METHOD, APPARATUS AND SYSTEM FOR GPS TIME SYNCHRONIZATION USING CELLULAR SIGNAL BURSTS

CROSS REFERENCE TO RELATED APPLICATIONS

This application is a continuation of U.S. patent application Ser. No. 09/777,521 filed Feb. 5, 2001 now U.S. Pat. No. 6,678,510, from which priority is claimed under all applicable sections of Title 35 of the United States Code including, but not limited to, Sections 120, 121, and 365(c).

FIELD OF THE INVENTION

The present invention relates to navigating using a global positioning system (GPS), and in particular to systems for providing assisted-GPS and for providing GPS time recovery, especially in weak signal conditions.

BACKGROUND OF THE INVENTION

The operation of a global positioning system (GPS) receiver is predicated on the receiver having a precise value for GPS time; without such a precise value, the ranges (from the receiver to one or more of the GPS satellites) computed by the receiver are inaccurate, since they are determined simply as the difference between the time of transmission and time of receipt multiplied by the speed of light. GPS navigation therefore relies on all elements of GPS (including both satellites and GPS earthbound receivers) having a clock synchronized to GPS system time, which is an approximate version of so-called coordinated universal time (UTC). GPS (more specifically, the GPS ground monitoring network) disseminates corrections to each satellite (which uses a high accuracy local clock) to account for the bias and offset of the satellite clock compared to GPS system time, and the satellites provide these corrections in the navigation message they each broadcast; therefore all satellites are synchronized. A GPS receiver, on the other hand, determines the offset of its local clock as part of the solution of the GPS receiver position. In doing so, however, to the extent that the GPS local clock is significantly out of synchronization, the calculation of the GPS receiver position is prolonged. Therefore, it is advantageous, in general, to provide a means of synchronizing a GPS receiver clock to GPS system time.

In sufficiently weak GPS signal conditions, a GPS receiver cannot determine GPS time unassisted. In such conditions, either the exact GPS time has to be recovered to carry out positioning, or positioning must stop. To avoid having to halt positioning, time recovery must be assisted, and there are many ways to assist a GPS receiver in carrying out time recovery, one being to deliver the exact GPS time from a cellular network, such as a GSM network.

Unfortunately, a standard GSM network is not synchronized to any universal time reference, since cellular communication is not per se a navigation tool and therefore there is no need for a universal synchronized time in providing cellular communications. The only time synchronization that is needed is time slot synchronization, where a mobile station synchronizes itself to a base station schedule in order to keep its own transmission in its assigned time slot and to pick up the messages from the base station intended for the mobile station. Such synchronization is therefore (and need only be) relative (between a mobile station and a base station) as opposed to universal. To enable deriving a universal time from such a cellular network, new equipment and new messages are needed.

There is a device that provides a GPS/GSM timing relationship (mapping); it is called a Location Measurement Unit (LMU); an LMU can be thought of as a specialized GPS receiver located at a cellular base station, a GPS receiver adapted to time-stamp with GPS system time communication signal bursts to mobile stations. An LMU time-stamps with GPS time the communication signal bursts from base stations. An LMU provides to a GPS receiver (a GPS receiver configured to make use of the LMU provided information) the help needed in weak signal conditions in constructing GPS time (i.e. in synchronizing with GPS system time). The LMU provides a so-called reference time information element, in which it indicates which GSM signal frame, time slot and bit are to be used as a time reference point, according to which for example a mobile station can remove the GSM system delay, and so recover exact GPS time.

For typical GPS receiver positioning accuracy, GPS time must be known to within ~10 µs in the receiver. Such accuracy is difficult to achieve using an LMU-based system for time synchronization according to the prior art. According to the prior art, a GPS receiver is adapted to make use of the LMU assistance by including a cellular component that responds to the LMU message (including picking up the actual trigger in the indicated signal frame, time slot, and bit) and a GPS component that needs the time synchronization information (see FIG. 1). The two components communicate via a software connectivity channel. There are, however, significant random delays in communicating messages over a software connectivity channel, i.e. internal delays arising because of use of the software connectivity channel for various other tasks besides only providing LMU time synchronization information. (Random delays occur inside buses used by a GPS receiver, buses where messages are transmitted from one software server to another using a dedicated software messaging architecture. Such delays can be tens of milliseconds in duration.)

What is needed is a way of providing LMU time synchronization information (or time synchronization information derived from any other aspect of a cellular communication signal) to the component of a GPS receiver that needs the time synchronization information in a way that avoids any significant variable internal delays.

SUMMARY OF THE INVENTION

Accordingly, the present invention provides a system, apparatus and corresponding method for time synchronization, using cellular signal bursts, of for example a global positioning system (GPS) receiver, the method including the steps of: a) having a cellular module respond to a cellular communication signal indicating a time-stamp, by providing a trigger pulse derived from the data component of the cellular communication signal, and also by providing information indicating a time-mark relating the trigger pulse to a universal time; b) having a main module, with access to a clock that provides a signal indicating local time, respond to the information indicating the time-mark; c) communicating the trigger pulse to a timing register coupled to the main module, the communicating being performed via a special hardware path that provides the trigger pulse without substantial random delay; d) having the timing register respond to the signal indicating local time, and also respond to the trigger pulse, by holding information indicating, in local time, when the trigger pulse is received by the timing register; and e) having the main module access the timing register and so obtain the time when the trigger arrives, and further having the main module determine the difference between when the information indicating the time-mark arrives and when the trigger arrives.

In a further aspect of the invention, the method also includes the step of having a frame counter generate the trigger pulse when the frame counter identifies a new frame in the cellular communication signal.

In another further aspect of the invention, the method also includes the step of having a time slot counter generate the trigger pulse when the time slot counter identifies a new time slot in the cellular communication signal.

In yet another further aspect of the invention, the method also includes the step of having a data bit counter generate the trigger pulse when the data bit counter identifies a new data bit in the cellular communication signal.

In yet even another further aspect of the invention, the main module is a global positioning system (GPS) module responsive to a GPS satellite navigation signal.

Thus, the present invention provides a hardware trigger pulse for synchronizing, based on a cellular communication signal, devices to a universal time reference. For example, the present invention can be used to synchronize a GPS receiver clock to GPS system time. In such an application, the invention avoids almost all internal delays in providing a GPS receiver clock component with time synchronization information, enabling better than ~10 µs accuracy in GPS time recovery even in weak GPS signal conditions.

From a second perspective, the invention provides a method comprising the steps of: receiving a cellular communication signal with a cellular module; providing a trigger pulse derived from the data component of the cellular communication signal, and providing information relating the trigger pulse to time; receiving the trigger pulse in a timing module component of a non-cellular module; and resolving a value for time using the trigger pulse and the information relating the trigger pulse to time. Further, the method may also comprise a step of having a frame counter, or a data bit counter, or a time slot counter generate the trigger pulse when the frame counter identifies a new frame in the cellular communication signal. Also further, the non-cellular module may be a GPS module, responsive to a GPS satellite navigation signal.

From a third perspective, the invention provides an apparatus, comprising: a cellular module, for receiving a cellular communication signal, and for providing a trigger pulse derived from the data component of the cellular communication signal, and also for providing information relating the trigger pulse to time; a timing module component of a non-cellular module for receiving the trigger pulse; and means for receiving the information relating the trigger pulse to time and for resolving a value for time using the trigger pulse and the information relating the trigger pulse to time. Further, the apparatus may also comprise one or another type of counter, such as a frame counter or a time slot counter or a data bit counter, and the trigger pulse may be provided when the counter indicates a new frame or time slot or data bit. Further, the non-cellular module may be a GPS module providing functionality for operation as a GPS receiver, and may be further responsive to a GPS satellite navigation signal.

From a fourth perspective, the invention provides a system comprising an apparatus according to the third perspective, and also a cellular base station, for providing the cellular communication signal.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
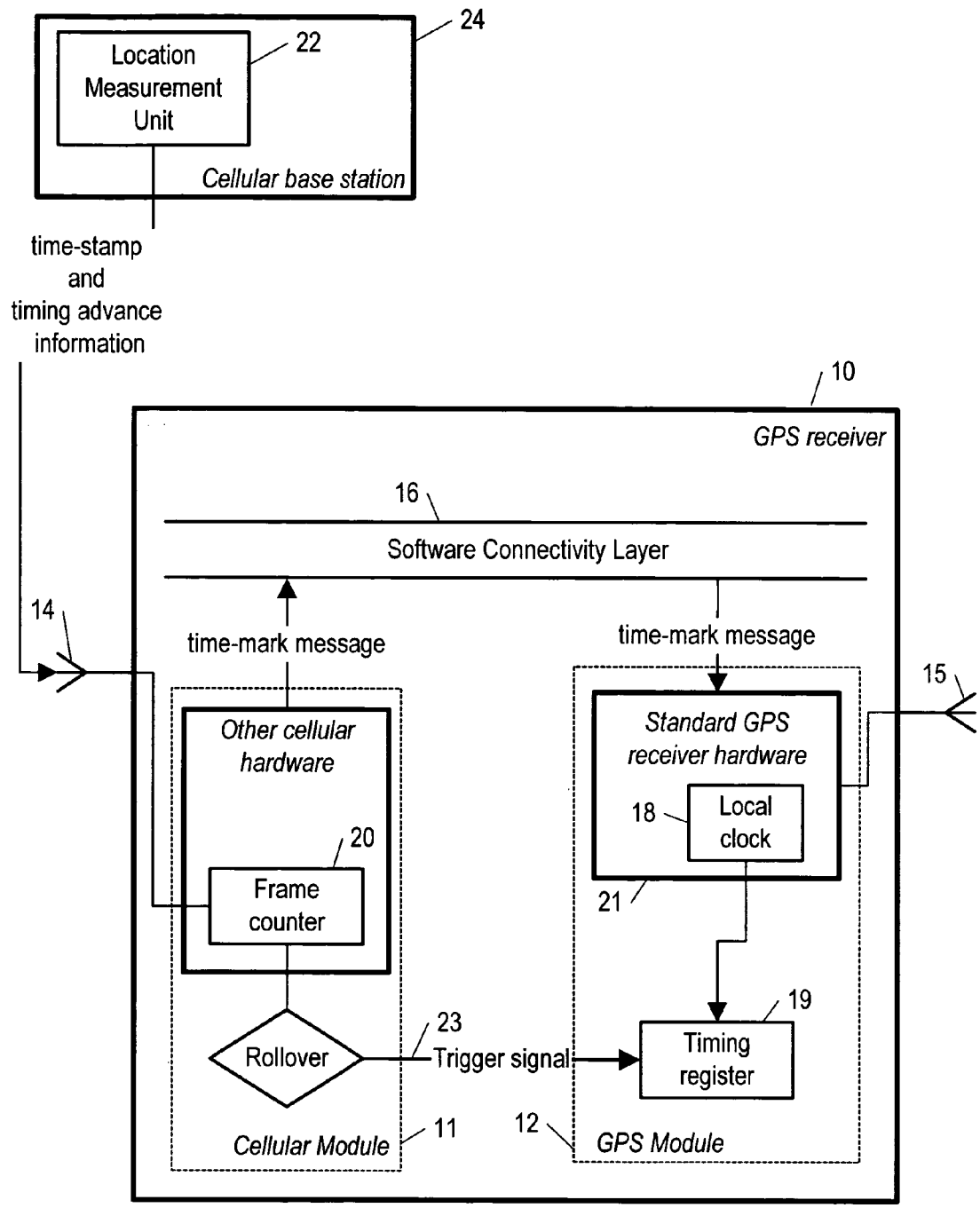
FIG. 1 is a simplified illustration of a GPS receiver including modules for providing time synchronization according to the present invention.

Referring now to FIG. 1, a global positioning system (GPS) receiver 10 according to the invention is shown as including a cellular module 11 (not necessarily providing a complete cellular communication capability) and a GPS module 12. The cellular module responds to a cellular communication signal through a cellular antenna 14. The GPS module includes standard GPS hardware 21 for responding to GPS navigation signals via a GPS antenna 15. The cellular module processes cellular communication signals so as to extract time synchronization information, such as from a Location Measurement Unit (LMU) message, as described above. The cellular communication signal consists of data organized into frames, including delimiters (headers and footers) enabling the cellular module to distinguish one frame from the next. The cellular module includes a frame counter 20 for counting frames. The frame counter also detects the frame edges, which are used, e.g., in frequency reconstruction. The frame counter is mentioned here just as an example. In GSM cellular communication, there could be also a time-slot counter and a bit counter, and corresponding edge detectors as well.

The frame counter identifies a frame edge and so indicates the instant when a new frame is received.

The GPS receiver 10 also includes a software connectivity layer 16, by which the cellular module and GPS module communicate messages, but messages so communicated are subject to random delays in being delivered because of other message traffic being communicated via the software connectivity layer (message traffic for example between different components of the GPS module).

According to the invention, every time the frame counter indicates a new cellular communication signal frame, a trigger pulse is generated and communicated to the GPS module via a special hardware path 23 having either essentially no delay or a delay that is known and so can be taken into account, i.e. providing the trigger pulse substantially free of random delay. The trigger pulse is used to latch a register 19 in the GPS module, a register called here a timing register, so that the register stores internal time (not UTC time), i.e. the time indicated by the GPS receiver oscillator/local clock 18. (The GPS receiver local clock 18 is typically implemented as an internal counter, as part of the GPS hardware. The latching results in either storing the current value of the local clock in the register or resetting the internal counter.)

At the same time as the trigger pulse is being generated and provided via the special hardware path 23 to the timing register 19, the corresponding frame number (or alternatively the time slot or bit number, as explained below) is transmitted to the GPS hardware 21 via the software connectivity layer 16. If the GPS hardware has already been set to GPS time (by a procedure described below), it remains synchronized (i.e. it counters clock drift) by stabilizing the local clock using the trigger pulses. To set GPS time in the GPS module to begin with, however, i.e. when the GPS receiver is powered on, the cellular model uses a time-stamp it receives from an LMU 22 at a nearby base station; the time-stamp specifies that an indicated GPS time is to be associated with receipt of an indicated frame number, time slot and bit number. The frame referenced in the time-stamp is a frame that was already transmitted (either broadcast or transmitted point-to-point to the GPS receiver). The time-stamp includes GPS time associated with the frame, time slot, and bit. (The time stamp does not, however, include propagation delay. There is no way to know in the LMU, how far the GPS receiver is from the serving base station where the LMU is located. Propagation delay over the air interface is compensated for with a so-called Timing Advance (TA) measurement, which is provided by the cellular system. TA is measured from a round trip delay between the receiver and the serving base station.)

Once the cellular module has the time-stamp, it can prepare what is here called a time-mark message (as opposed to a time-stamp message); a time-mark message indicates the GPS time to be associated with a yet-to-be-received frame. As soon as the frame of the time-mark message is received, the corresponding trigger pulse is sent to the GPS module along the special hardware path 23, and the frame number and time-mark message are communicated to the GPS module via the software connectivity layer. The GPS module records the time of arrival of the time-mark message according to the time showing on the local clock 18 and the time showing on the local clock 18 when the trigger pulse arrives is written into the timing register 19. The invention accounts for the delay in the GPS module receiving the time-mark message via the software connectivity layer 16 by noting the time of arrival of the time-mark message (according to the local clock 18), and subtracting the time stored in the timing register 19 (also according to the local clock 18) caused by the trigger pulse corresponding to the frame indicated in the time-mark message.

For example, suppose that GPS time is 134,566 seconds from the beginning of the current GPS week at frame number (FN) 122, time slot number 5, and bit number 43, i.e. suppose that the GPS to cellular time mapping (the time-stamp), is 134566@(122,5,43). In other words, the exact GPS time was 134,566 seconds from the beginning of the current GPS week when the base station transmitted frame number (FN) 122, time slot number 5, and bit number 43. Suppose further that a GPS receiver according to the invention (i.e. having a cellular module coupled to a GPS module as indicated in FIG. 1) has just been powered on. Then the cellular module of the GPS receiver sooner or later receives an LMU broadcast of a time-stamp. The cellular module also receives a succession of cellular frames. The cellular module provides a trigger (just a pulse, not communicating a frame number or other information) each time a new frame is received, and also provides (over the software connectivity layer) the number of each new frame, numbers it receives from the base station. The GPS module figures that the first trigger it receives over the hardware path goes with the first frame number it receives over the software connectivity layer, and so on. In applications where there is a risk that the time-mark message might be associated with the wrong trigger pulse (because the delay over the software connectivity channel might sometimes be so long that the time-mark arrives over the channel after the next trigger arrives over the hardware path), the trigger pulse is sent only once.

A cellular module measures the propagation delay correction before a communication channel is opened. A measurement of the propagation delay is one part of the handover process involved in opening a communication channel. The propagation delay is thus always known to a cellular module.

The reason that the cellular module does not use the time-stamped frame itself (the frame used to measure the relationship between GPS system time and the time when the time-stamped frame is broadcast or otherwise transmitted) as the frame for generating the trigger (i.e. for the time-stamp frame) is because time stamping is performed by a cellular network element, one that measures the relationship between GPS system time and the transmission of a selected GSM frame (what is called here the time-stamped frame, as opposed to the time-stamp frame, which bears some or all of the result of the measurement). The result of the measurement cannot then of course be broadcast in the same, selected (time-stamped) frame, since the selected frame (identified by frame number) has already been broadcast, i.e. the message frame that contains the time-stamp information, called the time-stamp frame, cannot be the same frame that was used for measuring the GPS/GSM relation, that frame being called here the time-stamped frame.

A delay is also introduced in the cellular module 11, because the cellular module must wait until the message frame (i.e. the time-stamp frame) arrives at the cellular module before the cellular module provides the trigger for the GPS module 12. In practice, the time stamp and other assistance data do not fit into one data frame, but are instead split into or conveyed using multiple frames (all of which are referred here as time-stamp frames). The assistance data is then not analyzed, nor is the trigger pulse generated, until after all the (time-stamp) frames bearing the assistance data have been received. So there is always a delay between when the frame that is used to determine the relationship between a GSM frame and GPS system time is broadcast (or otherwise transmitted), and when the frame that triggers the register (the so-called time-stamp frame) is broadcast (or otherwise transmitted).

Now suppose that the GPS time at FN 1002 is to be determined (because the frame that was time stamped has already been transmitted, but FN 1002 has just been received). The time-stamp (GPS to cellular time mapping) is used to determine the exact GPS time when FN 1002 is received by the cellular module, according to, GPS_Time@(1002,1,1)=GPS_time@(122,5,43)+(1002–122)×Frame_time–5×Time_slot_time×43×Bit_time, in which frame_time, time_slot_time and bit_time are the time intervals for each of the indicated objects (frames, time_slots, and bits) in cellular communication. So the cellular module of the GPS receiver then knows the exact GPS time as soon as FN 1002 is received, but not the GPS module. To set the local clock of the GPS module to GPS time, the GPS time corresponding to FN 1002 must be communicated from the cellular module to the GPS module, but that can only be done over the software connectivity layer, and a message provided over the software connectivity layer experiences delays unknowable in advance. Therefore, according to the invention, the time at FN 1002 (i.e. the time-mark message) is communicated over the software connectivity layer, but in addition, the GPS module receives the trigger from the cellular module and also receives over the software connectivity layer (a little later, with a delay unknowable in advance) the frame number associated with the trigger. The GPS module writes into the timing register 19 the time, according to its internal/local clock 18, when each last trigger is received, including the trigger associated with the frame indicated in the time-mark message. In addition, the GPS module records the time it receives the time-mark message, i.e. GPS_time@(1002,1,1). Now the time written in the timing register 19 is according to the GPS module local clock 18, and the time recorded when the time-mark message is received over the software connectivity layer is also according to the GPS module local clock 18. The difference between these two times is the delay encountered by the time-mark message over the software connectivity layer, and so, according to the invention, that difference is added to the value received as the GPS time at FN 1002 (via the time-mark message) to correct for the delay. The GPS module therefore has a precise GPS time essentially as soon as it receives the time-mark message over the software connectivity layer. (The time to compute the delay, and the time to determine the GPS time at FN 1002 given the time-stamp of an earlier frame/slot/bit is neglected.)

Figure 2:
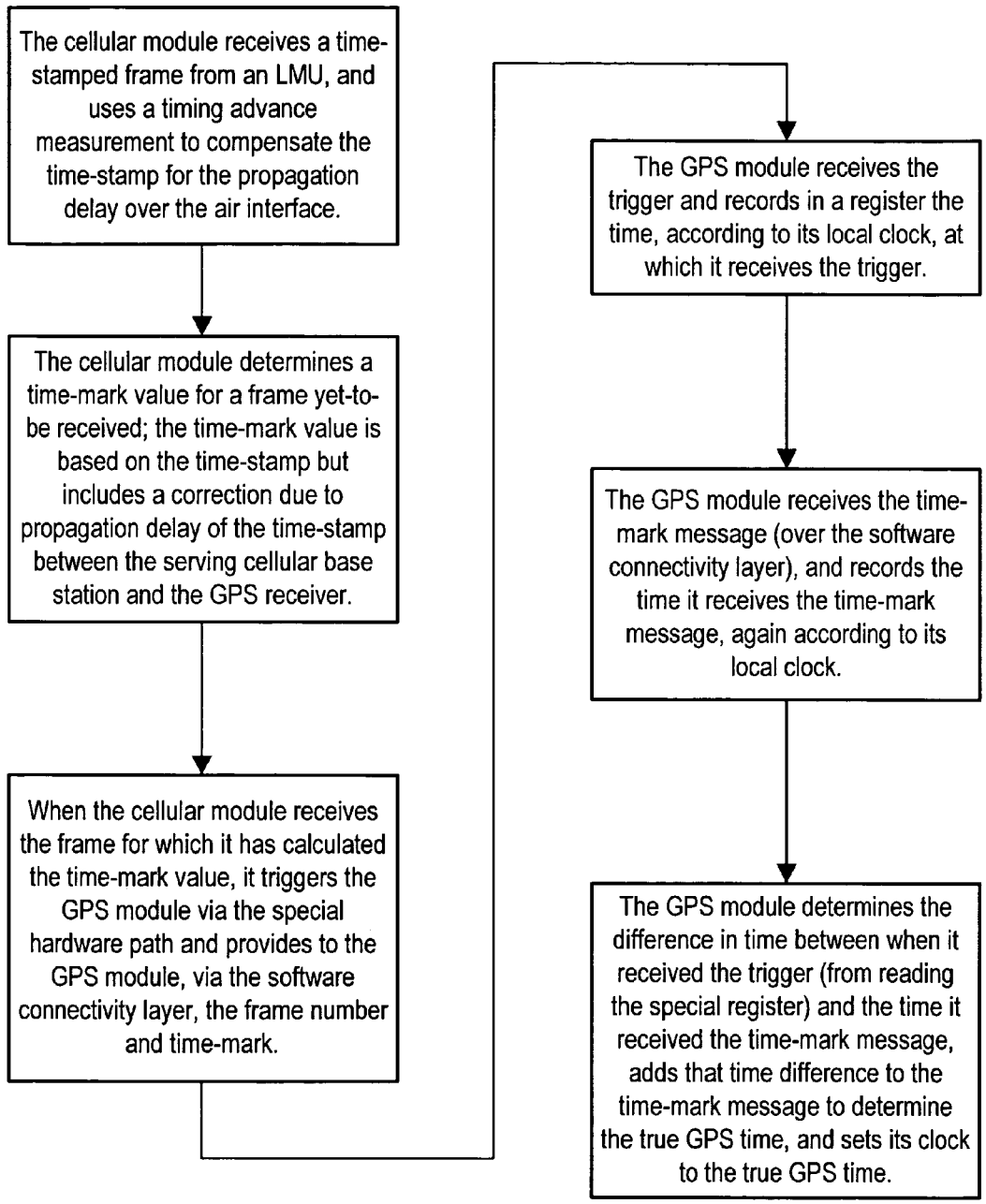
FIG. 2 is a flowchart of a method of synchronizing the GPS module of FIG. 1 to the time reference provided by a cellular communication system.

Referring now to FIG. 2, the invention in the preferred embodiment thus provides a setting of the GPS clock of a GPS receiver according to the following steps (which, for the sake of clarity, do not include having the cellular module provide a trigger for each new frame received, but instead only for the frame for which the time-mark is provided).
1. The cellular module receives a time-stamped frame from an LMU. An estimate for the propagation delay over the air interface is found from a timing advance measurement or a similar measurement. The cellular module uses the timing advance measurement or other, similar measurement, to compensate the time-stamp for the propagation delay over the air interface.
2. The cellular module determines a time-mark value for a frame yet-to-be received; the time-mark value is based on the time-stamp but includes a correction due to propagation delay of the time-stamp between the serving cellular base station and the GPS receiver. (The cellular module determines the propagation delay by sending a signal to the serving base station that is understood by the serving base station to be echoed, and measures how long it takes to receive the echo. The timing advance is then calculated from the "round trip" for the signal.)
3. When the cellular module receives the frame for which it has calculated the time-mark value, it triggers the GPS module via the special hardware path and provides to the GPS module, via the software connectivity layer, the frame number (which it receives from the base station) and time-mark.
4. The GPS module receives the trigger and records in a register the time, according to its local clock, it receives the trigger.
5. The GPS module receives the time-mark message (over the software connectivity layer), and records the time it receives the time-mark message, again according to its local clock.
6. The GPS module determines the difference in time between when it received the trigger (from reading the special register) and the time it received the time-mark message, adds that time difference to the time-mark message to determine the true GPS time, and sets its clock to the true GPS time.

Whether the GPS receiver sets the clock in its GPS module over and over again (to account for drift) or only once each time the GPS receiver is powered on depends on the application. For an MS-based GPS-type solution, the above procedure is performed only when the GPS receiver is powered on. For MS-assisted GPS, the above procedure is needed for every fix.

Use of a (cellular signal) frame counter (or a time slot counter, bit counter, or, in a CDMA system, a chip counter, or other, similar devices), which would have to be provided as additional equipment in a GPS, is just one way to implement the present invention, and it is the preferred embodiment for some applications, applications where it is not necessary to have the highest possible accuracy. In case of GSM cellular communication, a frame counter can be used to generate a trigger pulse at a frequency of 216.68 Hz. It is also possible to generate trigger pulses at the time slot rate (there being eight time slots per frame) using a time slot counter; use of the time slot rate would give a trigger pulse at a frequency of 1733.4 Hz. It is possible to generate a trigger pulse at an even still higher frequency; using the bit rate 156.25 bits per time slot would give a trigger pulse at a frequency of 270844.17 Hz (i.e. using a data bit counter instead of the frame counter would in the case of a GSM cellular communication signal provide a trigger pulse at a frequency of 270844.17 Hz). In other cellular systems besides GSM, data rates and data structures are of course different, and the invention is not intended to be restricted to GSM cellular communication.

To implement the present invention, a typical GPS receiver would have to be modified to include a cellular module with at least the functionality indicated above, as well as hardware for providing the trigger pulse and the hardware associated with the clock register.

There are other uses for an absolute time reference besides assisting GPS receivers in recovering GPS time. Absolute time can also be used to measure drift of cellular base station clocks with respect to GPS time, and to measure time differences between neighboring base stations. Such measurements are needed for example in network-based positioning methods including Enhanced Observed Time Difference (E-OTD) and Time of Arrival (TOA) positioning methods.

Note that it is not necessary that the cellular module 11 construct the time-mark message. The cellular module in some applications sends only a "Register triggered with Frame No. 1022" message to some other entity, which may reside outside of the GPS receiver or may be the GPS module, and that other entity calculates the time-mark.

Note also that although the invention has been shown and described in the preferred embodiment in which the GPS module 12 includes a (local) clock 18, in other applications the clock used by the GPS module to provide (local) time is located outside of the GPS module. For example, the clock is in some applications shared with some another entity such as the cellular module. The clock used by the GPS module can even reside outside of the GPS receiver.

It should also be noted that the invention is of use in providing a basis for setting the clock used by a module which is other than a GPS module. The invention should be understood to be of use in setting the clock used by any application that requires some version of universal time.

It is to be understood that the above-described arrangements are only illustrative of the application of the principles of the present invention. Numerous other modifications and alternative arrangements may be devised by those skilled in the art without departing from the scope of the present invention, and the appended claims are intended to cover such modifications and arrangements.

What is claimed is:

1. A method, comprising the steps of:
   a) having a cellular module respond to a cellular communication signal indicating a time-stamp, by providing a trigger pulse derived from the data component of the cellular communication signal, and also by providing information indicating a time-mark relating the trigger pulse to a universal time;
   b) having a main module, with access to a clock that provides a signal indicating local time, respond to the information indicating the time-mark;
   c) communicating the trigger pulse to a timing register coupled to the main module, the communicating being performed via a special hardware path that provides the trigger pulse without substantial random delay; and
   d) having the timing register respond to the signal indicating local time, and also respond to the trigger pulse, by holding information indicating, in local time, when the trigger pulse is received by the timing register.

2. The method of claim 1, further comprising the step of having a frame counter generate the trigger pulse when the frame counter identifies a new frame in the cellular communication signal.

3. The method of claim 1, further comprising the step of having a time slot counter generate the trigger pulse when the time slot counter identifies a new time slot in the cellular communication signal.

4. The method of claim 1, further comprising the step of having a data bit counter generate the trigger pulse when the data bit counter identifies a new data bit in the cellular communication signal.

5. The method of claim 1, wherein the main module is a global positioning system (GPS) module, responsive to a GPS satellite navigation signal.

6. An apparatus comprising:
   a) a cellular module, responsive to the cellular communication signal indicating a time-stamp, for providing a trigger pulse derived from the data component of the cellular communication signal, and for providing information indicating a time-mark relating the trigger pulse to a universal time;
   b) a main module having access to a clock that provides a signal indicating local time, the main module responsive to the information indicating the time-mark;
   c) a timing register, responsive to the signal indicating local time, and further responsive to the trigger pulse, for holding information indicating, in local time, when the trigger pulse is received; and
   d) a special hardware path, for conducting the trigger pulse from the cellular module to the timing register;
   wherein the main module is coupled to the timing register so as to be able to access the timing register and so obtain the time when the trigger arrives.

7. The apparatus of claim 6, further comprising a frame counter, and wherein the trigger pulse is provided when the frame counter indicates a new frame.

8. The apparatus of claim 6, further comprising a time slot counter, and wherein the trigger pulse is provided when the time slot counter indicates a new time slot.

9. The apparatus of claim 6, further comprising a data bit counter, and wherein the trigger pulse is provided when the data bit counter indicates a new data bit.

10. The apparatus of claim 6, wherein the main module is a global positioning system (GPS) module providing functionality for operation as a GPS receiver, the main module further responsive to a GPS satellite navigation signal.

11. A system comprising:
   a) a cellular module, responsive to the cellular communication signal indicating a time-stamp, for providing a trigger pulse derived from the data component of the cellular communication signal, and for providing information indicating a time-mark relating the trigger pulse to a universal time;
   b) a main module having access to a clock that provides a signal indicating local time, the main module responsive to the information indicating the time-mark;
   c) a timing register, responsive to the signal indicating local time, and further responsive to the trigger pulse, for holding information indicating, in local time, when the trigger pulse is received; and
   d) a special hardware path, for conducting the trigger pulse from the cellular module to the timing register;
   wherein the main module is coupled to the timing register so as to be able to access the timing register and so obtain the time when the trigger arrives.

12. The system of claim 11, further comprising a frame counter, and wherein the trigger pulse is provided when the frame counter indicates a new frame.

13. The system of claim 11, further comprising a time slot counter, and wherein the trigger pulse is provided when the time slot counter indicates a new time slot.

14. The system of claim 11, further comprising a data bit counter, and wherein the trigger pulse is provided when the data bit counter indicates a new data bit.

15. The system of claim 11, wherein the main module is a global positioning system (GPS) module providing functionality for operation as a GPS receiver, the GPS module further responsive to a GPS satellite navigation signal.

16. The system of claim 11, further comprising a cellular base station, for providing the cellular communication signal indicating a time-stamp.

17. A method, comprising the steps of:
   a) receiving a cellular communication signal with a cellular module;
   b) providing a trigger pulse derived from the data component of the cellular communication signal, and providing information relating the trigger pulse to time;
   c) receiving the trigger pulse in a timing module component of a non-cellular module; and
   d) resolving a value for time using the trigger pulse and the information relating the trigger pulse to time.

18. The method of claim 17, further comprising the step of having a frame counter generate the trigger pulse when the frame counter identifies a new frame in the cellular communication signal.

19. The method of claim 17, further comprising the step of having a time slot counter generate the trigger pulse when the time slot counter identifies a new time slot in the cellular communication signal.

20. The method of claim 17, further comprising the step of having a data bit counter generate the trigger pulse when the data bit counter identifies a new data bit in the cellular communication signal.

21. The method of claim 17, wherein the non-cellular module is a global positioning system (GPS) module, responsive to a GPS satellite navigation signal.

22. An apparatus, comprising:
   a) a cellular module, for receiving a cellular communication signal, and for providing a trigger pulse derived from the data component of the cellular communication signal, and also for providing information relating the trigger pulse to time;

b) a timing module component of a non-cellular module for receiving the trigger pulse; and c) means for receiving the information relating the trigger pulse to time and for resolving a value for time using the trigger pulse and the information relating the trigger pulse to time.

23. The apparatus of claim 22, further comprising a frame counter, and wherein the trigger pulse is provided when the frame counter indicates a new frame.

24. The apparatus of claim 22, further comprising a time slot counter, and wherein the trigger pulse is provided when the time slot counter indicates a new time slot.

25. The apparatus of claim 22, further comprising a data bit counter, and wherein the trigger pulse is provided when the data bit counter indicates a new data bit.

26. The apparatus of claim 22, wherein the non-cellular module is a global positioning system (GPS) module providing functionality for operation as a GPS receiver, the non-cellular module further responsive to a GPS satellite navigation signal.

27. A system comprising:

a) a cellular module, for receiving a cellular communication signal, and for providing a trigger pulse derived from the data component of the cellular communication signal, and also for providing information relating the trigger pulse to time;

b) a timing module component of a non-cellular module for receiving the trigger pulse;

c) means for receiving the information relating the trigger pulse to time and for resolving a value for time using the trigger pulse and the information relating the trigger pulse to time; and d) a cellular base station, for providing the cellular communication signal.

28. The system of claim 27, wherein the non-cellular module is a global positioning system (GPS) module providing functionality for operation as a GPS receiver, the non-cellular module further responsive to a GPS satellite navigation signal.

* * * * *